United States Patent [19]

Highsmith

[11] 4,200,343
[45] Apr. 29, 1980

[54] SEALING SYSTEM FOR A ROTARY ROCK BIT

[75] Inventor: Albert E. Highsmith, Grand Prarie, Tex.

[73] Assignee: Dresser Industries, Inc., Dallas, Tex.

[21] Appl. No.: 971,970

[22] Filed: Dec. 21, 1978

[51] Int. Cl.$^2$ .......................... F16C 33/78; E21B 9/35
[52] U.S. Cl. ................................. 308/8.2; 308/187.1; 175/372
[58] Field of Search ................... 308/8.2, 36.1, 187.1, 308/187.2; 175/371, 372

[56] References Cited

U.S. PATENT DOCUMENTS

| | | | |
|---|---|---|---|
| 3,397,928 | 8/1968 | Galle | 308/8.2 |
| 3,467,448 | 9/1969 | Galle | 308/8.2 |
| 3,604,523 | 9/1971 | Lichte | 308/8.2 |
| 3,656,764 | 8/1970 | Robinson | 308/8.2 |
| 3,761,145 | 9/1973 | Schumacher, Jr. | 308/187.1 |
| 3,944,306 | 3/1976 | Neilson | 308/8.2 |
| 4,168,868 | 9/1979 | Shields | 308/187.1 |

FOREIGN PATENT DOCUMENTS 1260080  3/1967  France ...................................... 308/8.2

Primary Examiner—Richard R. Stearns
Attorney, Agent, or Firm—Daniel Rubin; Eddie E. Scott

[57] ABSTRACT

A sealing system for a rotary rock bit retains lubricant inside the bit and acts as a barrier to the pulverized cuttings and other materials in the borehole to prevent the materials from entering the bearing area through the cone mouth opening of the rolling cone cutter. A protecting ring is positioned outside of an elastomer seal element. Both the protecting ring and the elastomer seal element are positioned in the cone mouth opening. The protecting ring is positioned in the cone mouth opening with a slight interference fit. This allows the elastomer seal element to be protected from the hostile drilling environment and increases seal life. The protecting ring retards materials in the borehole from contacting the seal element. The sealing system is provided without reducing the bearing capacity of the bit's bearing system.

2 Claims, 3 Drawing Figures

SEALING SYSTEM FOR A ROTARY ROCK BIT

TECHNICAL FIELD

The present invention relates to the art of rolling cone cutter earth boring bits and, more particularly, to a rolling cone cutter earth boring bit with improved means for sealing the bearings of the bit from the abrasive materials in the borehole and retaining lubricant within the bearing area.

BACKGROUND OF THE INVENTION

A rolling cone cutter earth boring bit consists of a main bit body adapted to be connected to a rotary drill string. The bit includes individual rotatable cone cutters mounted on individual bearing pins extending from the main bit body. Bearing systems are provided between the rolling cone cutters and the bearing pins to promote rotation of the cutters and means are provided on the outer surface of the cone cutters for disintegrating the earth formations as the bit and the cutters rotate. A sufficient supply of uncontaminated lubricant should be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A rolling cone cutter earth boring bit must operate under very severe conditions, and the size and geometry of the bit is restricted by the operating characteristics. At the same time, a longer lifetime and improved performance is needed from the bit. In attempting to provide an improved bit, new and improved materials have been developed for the cutting structure of the cone cutters. They have provided a longer useful lifetime for the cone cutters. This has resulted in the bearing systems of the bit being often the first to fail during the drilling operation. Consequently, a need exists for new and improved bearing systems to extend the useful lifetime of the bit and to allow development of other elements that interact with the sealing and bearing systems. In attempting to improve the bearing systems, various seal systems have been provided to maintain the bearing area free of harmful materials and retain lubricant. In attempting to provide new sealing systems, great care must be taken that the overall capacity of the bearing systems is not reduced.

In order to more fully appreciate the problems involved in providing new sealing systems for rolling cone earth boring bits, the following factors should be borne in mind. Relatively loose manufacturing tolerances inherently necessary in bit bearing assemblies create sealing problems that have not been satisfactorily solved. Tolerance requirements also present problems because of the tight fitting requirements. The bit bearings should be a maximum size to withstand the very heavy loads imposed while at the same time yielding to the hole size limitations specified by the user. A dilemma of adapting a maximum capacity bearing in a minimum of space is produced. This dilemma invariably leads to compromises which circumvent many of the well known requirements for proper assembly and use of high precision elements. This tolerance accumulation, though reasonable, is still far too much for effective operation of many forms of shaft seals. Extrusion and nibbling of elastomer seals in the gap between the rolling cone cutter and the bit body and eccentric rotation of the rolling cone cutter on the bearing pin are believed to reduce seal life.

DESCRIPTION OF PRIOR ART

Many bits utilize face type seals, usually of the rubber-coated Belleville spring-urged type since this type consumes a minimum of space. However, this rubber-coated spring has been only moderately successful because the rubber sealing element is subject to rapid deterioration both through friction heating and through abrasion from exposure to the very deleterious environment encountered in oil well or blast hole drilling operations. Face type seals have not provided the long life and sealing efficiency necessary for non-friction bearing bits. Tight fitting friction type journal bearings using shaft seals such as rubber O-rings have had a relatively high degree of success but only in areas where proper cooling, such as a circulating liquid, can be supplied to the bit exterior environment. Such seals tend to deteriorate rapidly if subjected to abrasive materials and heat.

In U.S. Pat. No. 3,761,145 to Percy W. Schumacher, Jr., patented Sept. 25, 1973, a drill bit seal means is shown. A drill bit including a roller cutter mounted on a greased bearing journal having a grease seal ring therearound and resilient means mounted between the seal ring and bearing journal to urge the seal ring against a sealing surface on the cutter in such a manner that the seal ring may be forced away from the cutter surface by some predetermined pressure from within the cutter but wherein the seal ring arrangement provides a substantially positive seal from pressures externally of the cutter to prevent detritus or other foreign material from entering into the bearing area interiorly of the drill bit cutter is provided. Elastomeric material may be provided between the seal ring and the cutter sealing surface.

In U.S. Pat. No. 3,656,764 to William P. Robinson, patented Apr. 18, 1972, a seal assembly for a drill bit is shown. An earth boring drill bit employing roller cutters is provided with an improved seal for inhibiting ingress of abrasive materials into the bearing surfaces and egress of lubricant. The improved seal is between an outwardly facing re-entrant corner on the journal and an inwardly facing re-entrant corner on the cutter. The seal is made by a pair of O-rings engaging the opposed re-entrant corners and separated by a floating rigid ring having opposed bearing surfaces for seating the O-rings into the corners. This seal accommodates radial, axial and angular displacements of almost twice the magnitude that can be accommodated by a single O-ring of the size of one of the O-rings without significantly increasing the length of journal needed for the seal.

In U.S. Pat. No. 3,397,928 to E. M. Galle, patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface thereon that opposes and engages the bearing surface on the shaft. A resilient packing ring is positioned in a groove in one of the surfaces. The packing ring, the groove and an opposing surface are sized such that upon assembly of the cutter element upon the shaft the cross sectional thickness of the packing ring is compressed by not less than substantially 10% of this thickness prior to assembly of the cutter element upon the shaft.

Other drill bit bearing sealing systems are shown in U.S. Pat. No. 1,884,965 to Baggett, U.S. Pat. No. 2,797,067 to Fisher, U.S. Pat. No. 3,075,781 to Atkinson, U.S. Pat. No. 3,096,835 to Neilson, U.S. Pat. No. 3,151,691 to Goodwin, U.S. Pat. No. 3,303,898 to Bercaru, U.S. Pat. No. 3,529,840 to Durham and U.S. Pat. No. 3,862,762 to Millsap.

SUMMARY OF THE INVENTION

The present invention provides a sealing system for a rolling cone cutter earth boring bit that acts as a barrier to the pulverized cuttings and other abrasive materials in the borehole to prevent these materials from entering the bearing area of the bit and retains lubricant within said bearing area. At least one cantilevered bearing pin extends from the bit body. A cutter receiving surface is located on the bit body. A rolling cone cutter is adapted to be rotatably mounted on the bearing pin. The rolling cone cutter includes a cone base positioned adjacent the cutter receiving surface and a cone mouth extending from the cone base. Bearing and cutter retaining means are located between the bearing pin and the rolling cone cutter. A protecting ring is positioned around the bearing pin between the bit body and the rolling cone cutter. The protecting ring is located in the cone mouth. An elastomer seal element is positioned around the bearing pin and located within the cone mouth inside the protecting ring. The above and other features and advantages of the present invention will become apparent upon consideration of the folowing detailed description of the invention when taken in conjunction with the accompanying drawings.

DETAILED DESCRIPTION OF THE INVENTION

Figure 1:
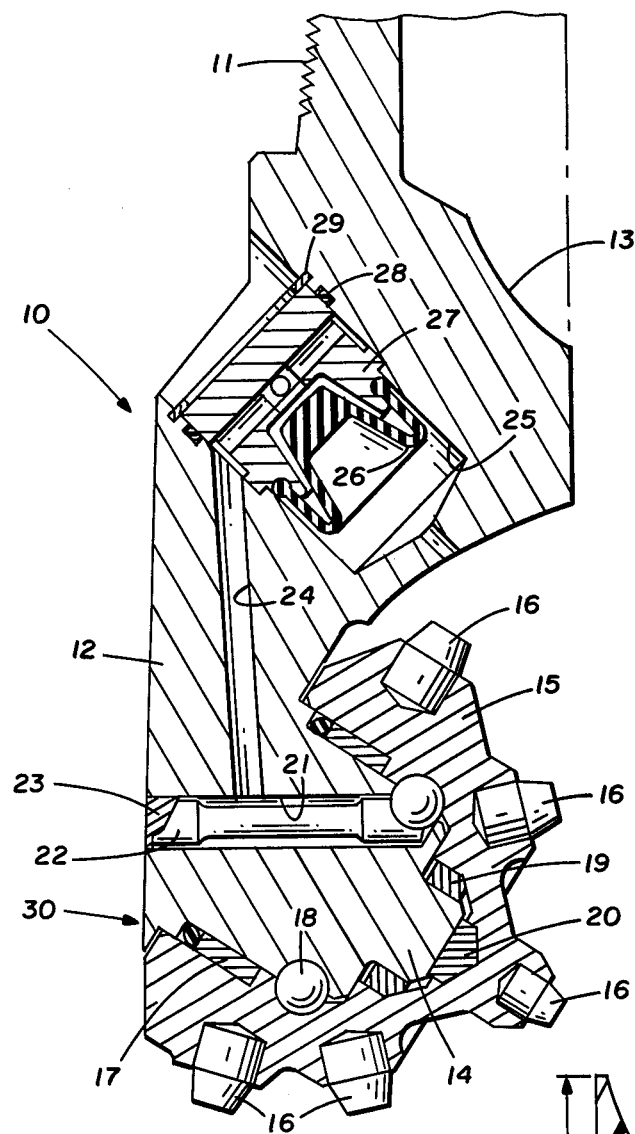
FIG. 1 is an illustration, partially in section, of one arm of an earth boring bit constructed in accordance with the present invention.

Referring now to FIG. 1, a sectional view of one arm 12 of a rolling cone earth boring bit 10 embodying the present invention is shown. The rolling cone cutter earth boring bit 10 consists of a main bit body 13 adapted to be connected to a rotary drill string. The bit 10 includes individual rotatable cone cutters mounted on individual bearing pins extending from the main bit body. A sealing system acts as a barrier to the pulverized cuttings and other abrasive materials in the borehole to prevent these materials from entering the bearing area of the bit and retains lubricant within the bearing area.

The arm 12 depends from the upper portion 11 of the bit 10. The upper portion 11 allows the bit to be connected to the lower end of a rotary drill string (not shown). The lower end of arm 12 is provided with an extended journal portion 14. A rolling cone cutter 15 is rotatably positioned upon the extended journal portion or bearing pin 14. The cutter 15 includes cutting structure 16 on its outer surface adapted to disintegrate the formations as the bit 10 is rotated and moved downward. The cutting structure 16 is shown in the form of tungsten carbide inserts. However, it is to be understood that other cutting structures may be used as the cutting structures on the cone cutter 15.

The bit 10 includes a central passageway extending along the centrl axis of the bit to allow drilling fluid to enter from the upper section of the drill string (not shown) immediately above and pass downward to the bottom of the well bore to flush cuttings and drilling debris from the well bore. A plurality of bearing systems are located in the bearing area between the cutter 15 and the bearing pin 14. The bearing systems in the bearing area include an outer friction bearing 17, a series of ball bearings 18, a friction bearing 19, and a thrust button 20.

The bit 10 is a lubricated sealed bearing bit. The lubrication system of bit 10 includes a passage 24 that extends through the arm 12 to bearing pin 14 to allow lubricant to be transmitted to the bearing systems. A passage 21 connected to passage 24 allows the make-up of the ball bearing system 18 by allowing the balls to be inserted into position after the cone cutter 15 is placed on the bearing pin 14. The series of ball bearings 18 serve to lock the cone cutter 15 on the bearing pin 14. After the balls are in place, a plug 22 is inserted into the bore 21 and welded therein by a weld 23. Plug 22 has a reduced diameter throughout the major portion of its length to allow lubricant to be transmitted to the bearing area. Additional passages may extend from bore 21 to the bearing area to insure a sufficient supply of lubricant to bearings 17, 18, 19 and 20.

A lubricant reservoir is located in the bit 10 to provide a supply of lubricant to the bearings. A flexible diaphragm 26 is positioned in the lubricant reservoir and encloses the reservoir to retain a supply of lubricant. The area within the reservoir chamber but outside of the diaphragm 26 is vented to the dome of the bit 10 by a passageway that connects the lower end of the reservoir chamber with the dome of the bit. The upper end of the lubricant reservoir is closed by a cap 27 locked in place by a snap ring 29. An O-ring seal 28 is positioned around the cap 27 to retain lubricant in the lubricant reservoir.

A seal assembly 30 is located between the surface of the bearing pin 14 in the cone mouth of the cone cutter 15. The improved seal means is provided without reducing bearing capacity. The seal assembly 30 retains the lubricant within the bit 10 and prevents the ingress of material in the borehole into the bearing area.

Figure 2:
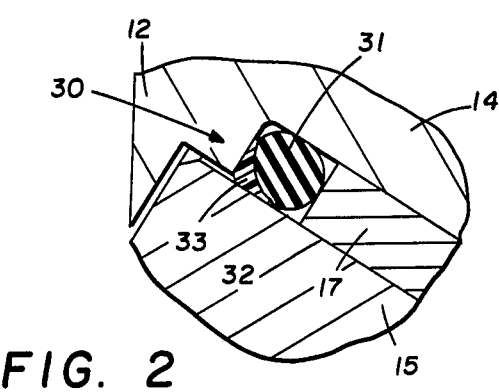
FIG. 2 is an enlarged view of the seal assembly of the bit shown in FIG. 1.

Referring now to FIG. 2, an enlarged view of the seal assembly 30 is shown. The present invention increases the protection of a dynamic O-ring seal element 31 from rock cuttings in the drilling fluid. This reduces seal wear and increases bearing life. The present invention tends to eliminate extrusion and nibbling of the O-ring element 31 and intrusion of abrasive particles from the formations being broken up caused by the gap between the arm 12 and the cone cutter 15 and by eccentric rotation of the cone cutter 15 about the journal or bearing pin 14. The present invention provides substantially zero clearance to eliminate, or partially eliminate, the intrusion of foreign particles from the drilling operation into the seal gland. The protecting ring of the present invention can be installed in existing rock bit O-ring designs formed by the two mating parts, the rock bit arm and the rolling cone cutter.

An annular groove 32 is provided in the cone mouth of the rolling cone cutter 14. An elastomer O-ring 31 is positioned in the groove 32. A protecting ring 33 is positioned in the groove 32 between the arm 12 and the rolling cone cutter 15. The outer diameter of the protecting ring 33 is dimensioned to have a slight interference fit with the sealing diameter of the rolling cone cutter 15. The protecting ring 33 is also positioned between the arm 12 and O-ring seal element 31.

The nature of the material from which the protecting ring 33 of this invention is made will allow it to always slide into its proper position in the sealing gland even when installed with an interference fit. The material from which the protecting ring 33 is made is of a type that is not detrimental to the O-ring seal as it is used up, or sacrificed, to protect the seal. For example, the protecting ring 33 may be constructed of a non-metallic material that is tough, resilient, and abrasion resistant. In some circumstances, with adverse tolerances, there can be a slight clearance between the protecting ring and the cone cutter sealing surface; however, the flexibility of the ring allows the lip that is compressed against the O-ring 31 to be forced against the seal surface of the rolling cone cutter 15 maintaining a zero clearance to prevent O-ring damage from nibbling and abrasion from formation particles.

Figure 3:
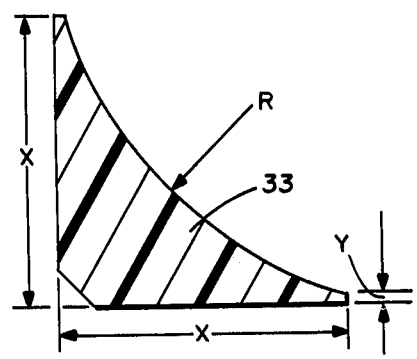
FIG. 3 is an enlarged view illustrating the protecting ring of the bit shown in FIGS. 1 and 2.

Referring now to FIG. 3, an enlarged illustration of the cross section of ring 33 is shown. The ring 33 is constructed of a material such as teflon, teflon compound with glass fibers, polycarbonate plastic (lexan) or other optimum material that is tough, abrasion resistant and resilient. The surface R that contacts the O-ring 31 has a radius R. The radius R is calculated to be the radius of the O-ring 31 in a compressed configuration. The sides "X" of the ring 33 are equal to the radius R.

The structural details of an earth boring bit 10 constructed in accordance with the present invention having been described, the operation of the bit 10 will now be considered with reference to FIGS. 1, 2 and 3. The present invention provides a cone mouth seal assembly 30 which will act as a barrier to the pulverized cuttings, keeping these cuttings from entering the bearing area through the cone mouth opening, thus providing an uncontaminated environment for the metal bearing elements and eliminating the abrasive wearing action of foreign materials in the bearing area. The lubricant is retained within the bit 10 to insure a long lifetime for the bearing systems. The arm 12 and cone base of cutter 15 cooperate with protecting ring 33 to restrict materials in the borehole from contacting the elastomer O-ring 31. The present invention eliminates extrusion and nibbling of the O-ring 31 and the intrusion of abrasive particles from the formations being broken up caused by the gap between the arm 12 and cone 15 and eccentric rotation of the cone cutter 15 about the journal or bearing pin 14.

The lubrication system of the bit 10 is filled with a suitable lubricant and the area above the flexible diaphragm 26 is completely filled with lubricant. The flexible diaphragm 26 seals the lower end of the lubricant reservoir and is held in place by the lower portion of the cap 27. The bit 10 will be lowered into a well bore until the cutter 16 contacts the earth formation at the bottom of the borehole. The hydrostatic pressure of fluid in the well bore is substantial and a pressure differential between the pressure of the lubricant inside of the bit 10 and the pressure of fluid in the borehole would ordinarily develop. The lubrication system of bit 10 allows the pressure of fluid in the well bore to be transmitted to the lubricant in the lubricant reservoir and the pressures are equalized as the bit 10 is moved through the borehole. Lubricant from the lubricant reservoir passes through passages 24 and 21 and is transmitted to the bearing systems.

The bit 10 is connected as the lowest element of a rotary drill string by engaging the bit 10 with the drill string by a threaded connection. The bit 10 is rotated and thrust downward, thrusting the cutter 15 against the earth formations. Continued rotation with the wieght of the drill string applying a thrust force to the bit 10 causes the cutters to disintegrate the formations and form the desired borehole. The cone mouth seal assembly 30 serves to prevent drill cuttings from entering the bearing area, retains the lubricant inside the bit and increases the life of the seal means thereby increasing the useful life of the bit 10.

The embodiments of an invention in which an exclusive property or privilege is claimed are defined as follows:

1. A rotary rock bit for forming a borehole wherein materials are encountered in the borehole, comprising:
   a rock bit body;
   at least one arm projecting from said rock bit body;
   a bearing pin extending from said arm;
   a rolling cone cutter adapted to be mounted on said bearing pin, said cone cutter having a base abutting said arm and a concave cavity projecting from a cone mouth, said cavity and cone mouth positioned over said bearing pin;
   bearing and cutter retaining means in said cavity between said bearing pin and said cone cutter;
   an annular seal space in said cone cutter located in said cone mouth;
   a tough, resilient and abrasion-resistant three sided protecting ring in said annular seal space located in said cone mouth adjacent said base between said arm and said cone cutter, said protecting ring having a curved side facing away from said arm and two sides meeting at an angle adjacent said base; and
   a compressed elastomer O-ring positioned between said cutter and said bearing pin and located in said cavity inside said protecting ring and contacting said curved side of said protecting ring for preventing entry of materials in the borehole into said cavity.

2. The rotary rock bit of claim 1 wherein said curved side of said protecting ring has a radius that is equal to the radius of said elastomer O-ring in the compressed condition and said two sides are equal to said radius.

* * * * *